United States Patent [19]

Frenkel et al.

[11] Patent Number: 4,874,079
[45] Date of Patent: Oct. 17, 1989

[54] ARTICLE TRANSFERRING CONVEYING SYSTEM

[75] Inventors: Robert L. Frenkel, Englewood; Christopher S. Derks; Donald L. Armstrong, both of Arvada, all of Colo.

[73] Assignee: Adolph Coors Company, Golden, Colo.

[21] Appl. No.: 153,311

[22] Filed: Feb. 8, 1988

[51] Int. Cl.[4] .............................................. B65G 47/68
[52] U.S. Cl. .................................... 198/436; 198/442
[58] Field of Search ............... 198/370, 436, 442, 580, 198/599, 637, 445

[56] References Cited

U.S. PATENT DOCUMENTS

| | | | |
|---|---|---|---|
| 2,215,702 | 9/1940 | Holm | 198/442 |
| 2,804,961 | 9/1957 | Carter | |
| 3,160,259 | 12/1964 | Dalton | |
| 3,710,918 | 1/1973 | Babunovic | 198/445 |
| 4,496,040 | 1/1985 | Kronseder et al. | |
| 4,619,358 | 10/1986 | May et al. | |

FOREIGN PATENT DOCUMENTS 2809586 9/1979 Fed. Rep. of Germany ...... 198/436

Primary Examiner—Joseph E. Valenza
Attorney, Agent, or Firm—Klaas & Law

[57] ABSTRACT

Apparatus for separating a continuous stream of filled beverage bottles moving in a single row in one linear direction into a plurality of spaced apart rows of filled beverage bottles moving in a direction substantially perpendicular to such one linear direction using at least first, second and third continuously moving conveyors moving in spaced apart parallel linear directions and a continuously moving collection conveyor moving in a linear direction substantially perpendicular thereto wherein the middle filled beverage bottle of three successive filled beverage bottles is moved at spaced apart intervals over the second or third continuously moving conveyors and onto the continuously moving collection conveyor to form spaced streams of filled beverage bottles thereon and wherein the filled beverage bottles remaining on the third continuously moving conveyor are transferred to the continuously moving collection conveyor to form another stream of filled beverage bottles thereon.

14 Claims, 4 Drawing Sheets

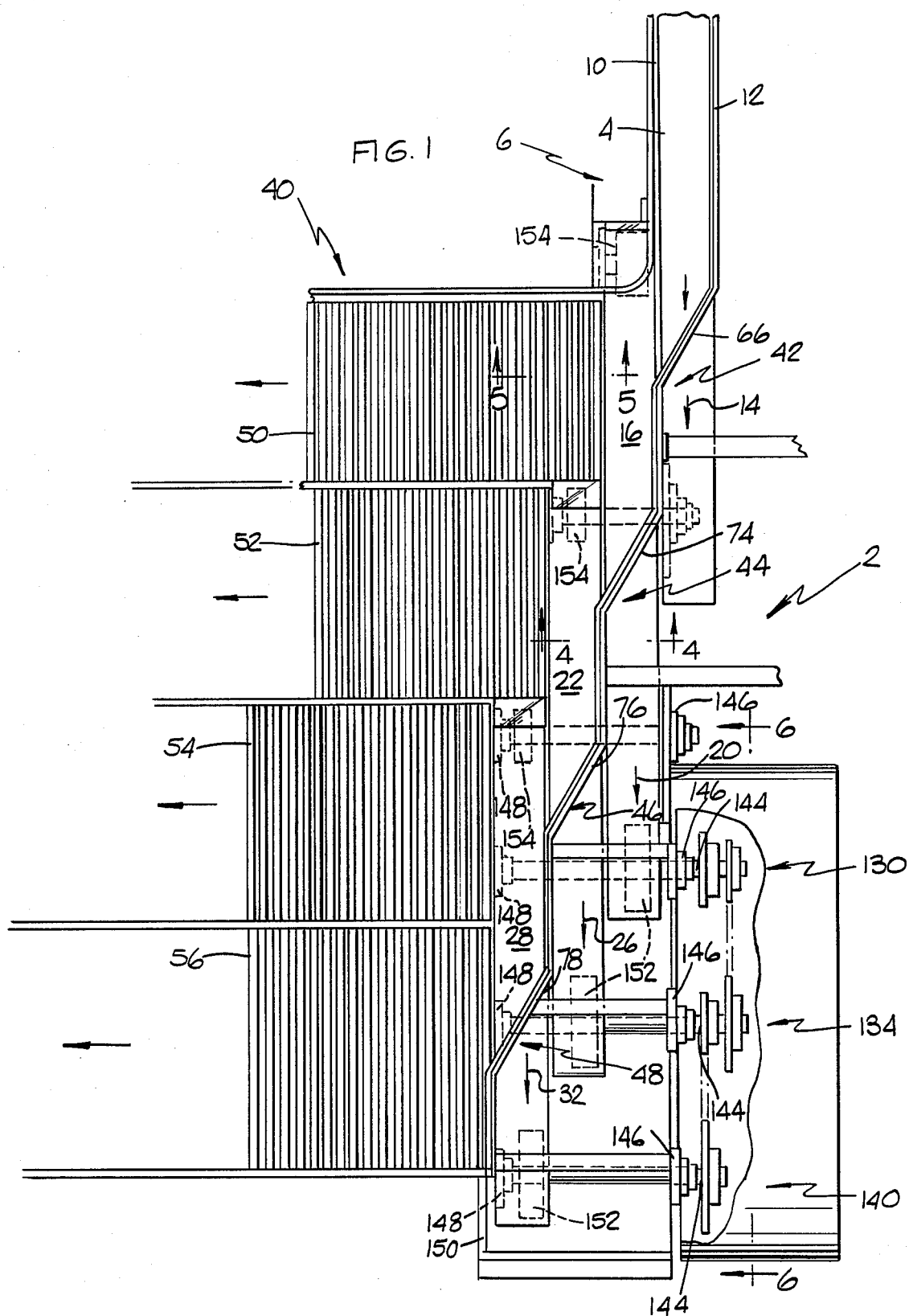

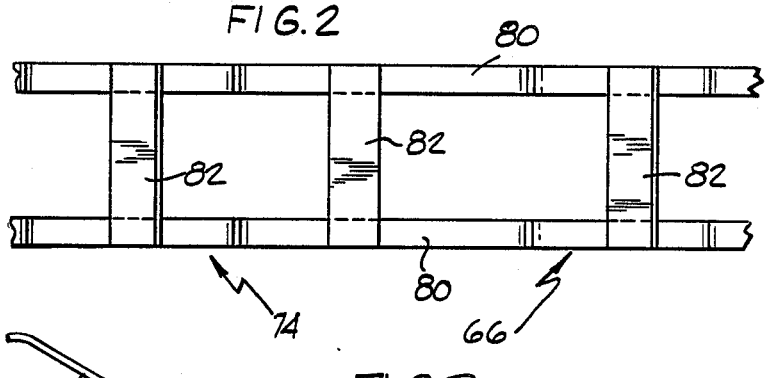
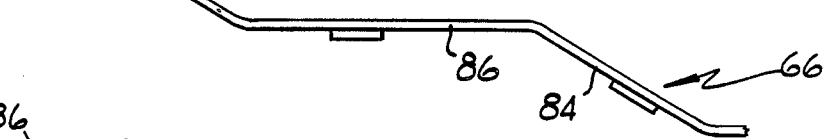
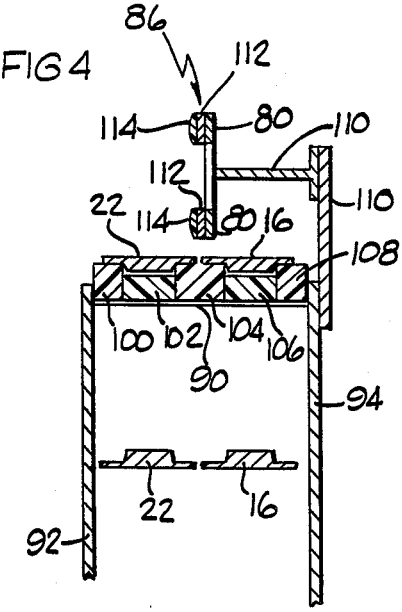
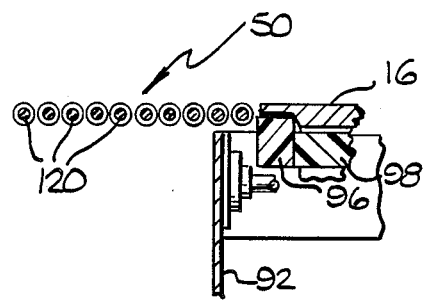
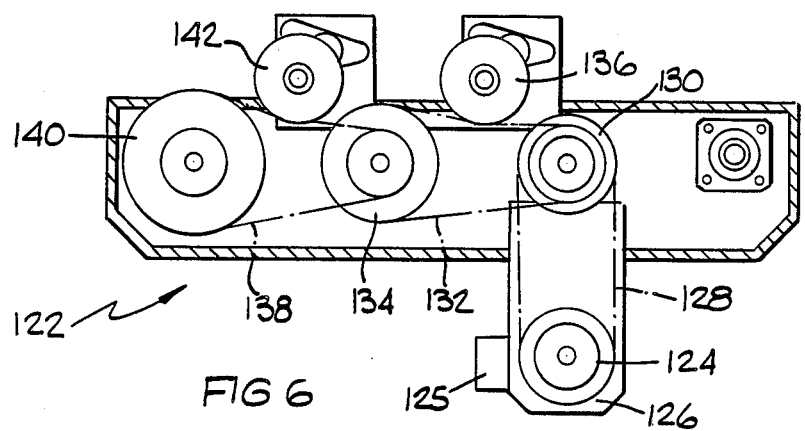

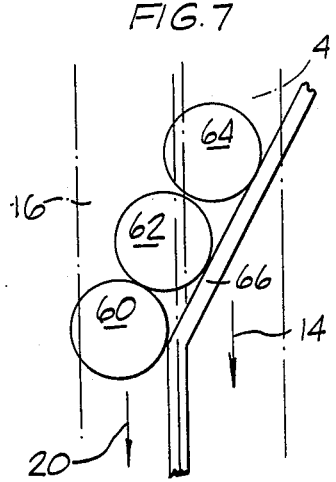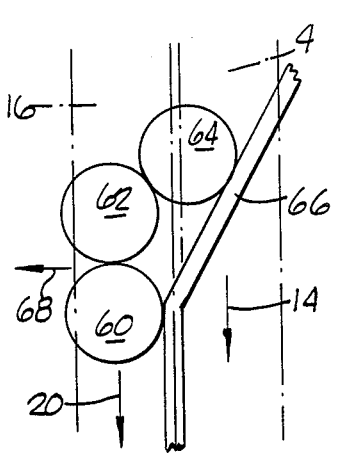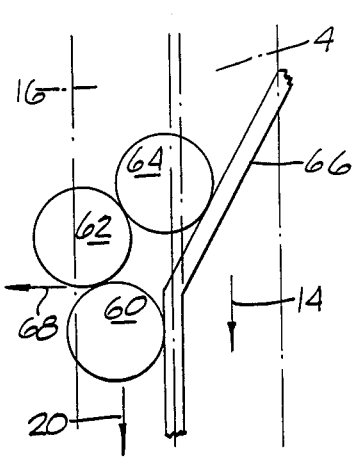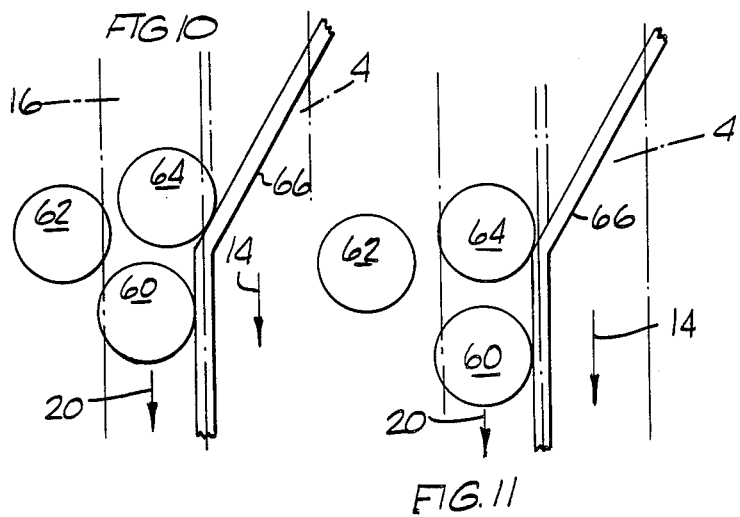

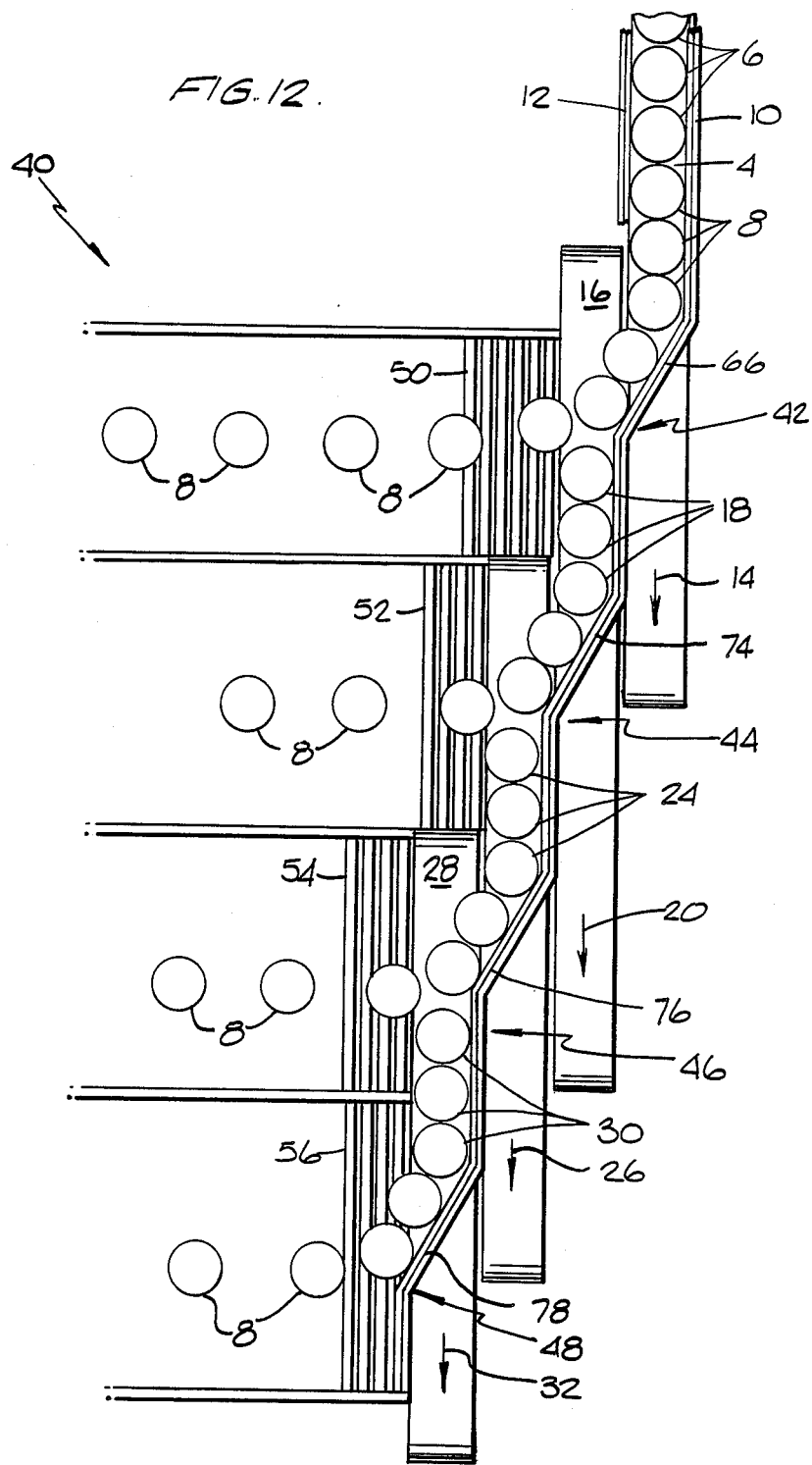

ARTICLE TRANSFERRING CONVEYING SYSTEM

FIELD OF THE INVENTION

This invention is directed generally to systems wherein the direction of movement of articles being conveyed is changed and more specifically to a conveying system wherein a plurality of articles moving in a row in one linear direction is separated into a plurality of rows of articles moving in a direction substantially perpendicular to the one linear direction.

BACKGROUND OF THE INVENTION

A conventional method of separating a plurality of articles, such as filled beverage bottles, moving in a single row in one linear direction into a plurality of rows of articles moving in a direction substantially perpendicular to the one linear direction comprises forming spaced apart mass accumulation of the articles and using side guides to move a single row of articles from the accumulation of articles into a row of articles moving in the perpendicular direction. This accumulation must be done at each location whereat it is desired to change the direction of movement of the articles. Such a method is illustrated in U.S. Pat. No. 2,804,961 to S. T. Carter. Such a system requires a relatively long and wide conveyor to accommodate the plurality of accumulations of articles. Also, this presents an additional problem wherein it is desirable to separate the single row of articles into a plurality of rows of articles which are spaced apart a relatively short distance. The accumulation of the articles, especially when they are filled beverage bottles, results in much noise and possible damage to the bottles and the labels thereon.

BRIEF DESCRIPTION OF THE INVENTION

This invention provides a continuously moving conveyor system for separating a continuous stream of articles moving in a single row in one linear direction into a plurality of spaced apart rows of articles moving in a direction substantially perpendicular to the one linear direction.

In a preferred embodiment of the invention, the above-described separation of the continuous stream of articles moving in a single row into a plurality of spaced apart moving rows of moving articles is accomplished by at least first, second and third continuously moving conveyor means moving in spaced apart, parallel linear directions and a continuously moving collection conveyor means moving in a linear direction which is substantially perpendicular to the linear direction of movement of the first, second and third continuously moving conveyor means. The term, row, as used herein, does not necessarily require that the articles in the row be in alignment. All of the continuous stream of moving articles are supported on the first and second continuously moving conveyor means at different periods of time. A first transfer means moves one article of the continuous streams of articles, at spaced apart intervals, over the second conveyor means and onto the continuously moving collection conveyor means at a first location thereon leaving a first remainder of articles supported on the second continuously moving conveyor means. All of the first remainder of articles are supported on said second and third continuously moving conveyor means at different periods of time. A second transfer means moves one article of the first remainder of articles, at spaced apart intervals, over the third continuously moving conveyor means and onto the continuously moving collection conveyor means at a second location thereon spaced from the first location and leaving a second remainder of articles supported on the third continuously moving conveyor means. A third transfer means moves the second remainder of articles onto the continuously moving collection conveyor means at a third location thereon spaced from the first and second locations. It is understood that additional continuously moving conveyor means moving in the same linear direction as the first, second and third continuously moving conveyor means and additional transfer means may be used to move articles onto the continuously moving collection conveyor means at additional spaced apart locations thereon. In the preferred embodiment of the invention, the articles comprise filled and sealed beverage bottles wherein the beverage is beer.

In operation of the preferred embodiment, the first transfer means moves the middle article of three successive articles over the second continuously moving conveyor means and onto the continuously moving collection conveyor means by using the first and third articles of the three successive articles to apply forces to the middle article wherein the resultant of the forces extends in a direction parallel to the linear direction of movement of the continuously moving collection conveyor means. The forces applied by the first and third articles of the three successive articles on the middle article are generated by moving the second continuously moving conveyor means at a velocity less than the velocity of the first continuously moving conveyor means. The second transfer means operates in the same manner as the first transfer means wherein the forces are generated by moving the third continuously moving conveyor means at a velocity less than the velocity of the second continuously moving conveyor means. Each of the first and second transfer means comprises linearly extending deflector means extending at an angle of between about 25 and 50 degrees to the linear directions of movement of the first, second and third continuously moving conveyor means and have beginning portions and ending portions. The deflector means are formed from a plastic material having a low coefficient of friction. In operation, the continuous stream of articles on the first continuously moving conveyor means moving in a first linear direction are separated to form spaced apart rows of articles on the continuously moving collection conveyor means moving in a linear direction perpendicular to the first linear direction.

BRIEF DESCRIPTION OF THE DRAWINGS

An illustrative and presently preferred embodiment of the invention is shown in the accompanying drawing in which:

FIG. 1 is a top plan view of an illustration of the conveyor system of this invention;

FIG. 2 is a side elevation of deflector means for this invention;

FIG. 3 is a top plan view of FIG. 2;

FIG. 4 is a cross-sectional view taken on the line 4—4 of FIG. 1 and slightly enlarged;

FIG. 5 is an enlarged cross-sectional view taken on the line 5—5 of FIG. 1;

FIG. 6 is a cross-sectional view taken on the line 6—6 of FIG. 1;

FIGS. 7-11 are schematic views illustrating the operation of the transfer system of this invention; and FIG. 12 is a schematic illustration of this invention in operation.

DETAILED DESCRIPTION OF THE INVENTION

A preferred embodiment of the article transferring conveyor system 2 of this invention is illustrated in FIGS. 1 and 12 and comprises a first continuously moving conveyor means 4 on which are supported a continuous stream 6 of articles 8 moving in a single row between spaced apart guide means 10 and 12. In the preferred embodiment, the articles 8 are filled and sealed beverage bottles wherein the beverage is beer. At least a portion of each of the bottles comprising a generally cylindrical outer surface adapted to contact the generally cylindrical outer surfaces of adjacent bottles and each of the generally cylindrical outer surfaces having substantially the same diameter. The first continuously moving conveyor means 4 moves in a linear direction as indicated by the arrow 14. A second continuously moving conveyor means 16 supports a first remainder 18 of articles from the articles 8 originally supported on the first continuously moving conveyor means 4 after some of the original articles 8 have been transferred to collection conveyor means, as described below. The second continuously moving conveyor means 16 is located next adjacent to but spaced from the first continuously moving conveyor means 4 and moves in a linear direction as indicated by the arrow 20 which is parallel to the linear direction of movement of the first continuously moving conveyor means 4. A third continuously moving conveyor means 22 supports a second remainder 24 of articles from the articles 8 comprising the remaining articles from the first remainder 18 of articles originally on the second continuously moving conveyor means 16 after some of the first remainder 18 of articles have been transferred to collection conveyor means, as described below. The third continuously moving conveyor means 22 is located next adjacent to but spaced from the second continuously moving conveyor means 16 and moves in a linear direction as indicated by the arrow 26 which is parallel to the linear direction of movement of the first and second continuously moving conveyor means 4 and 16. A fourth continuously moving conveyor means 28 supports a third remainder 30 of articles from the articles 8 comprising the remaining articles from the second remainder 24 of articles originally on the third continuously moving conveyor means 22 after some of the second remainder 24 of articles have been transferred to collection conveyor means, as described below. The fourth continuously moving conveyor means 28 is located next adjacent to but spaced from the third continuously moving conveyor means 22 and moves in a linear direction as indicated by the arrow 32 which is parallel to the linear directions of movement of the first, second and third continuously moving conveyor means 4, 16 and 22.

A continuously moving collection conveyor means 40 having portions thereof located next adjacent to but spaced from the second, third and fourth continuously moving conveyor means 16, 22 and 28 is adapted to receive and support articles 8 transferred thereto by the first, second, third and fourth transfer means 42, 44, 46 and 48. The continuously moving collection conveyor means 40 is illustrated in FIG. 1 as having four separate sections 50, 52, 54 and 56, but may comprise only one section. As illustrated in FIG. 12, all of the continuous stream 6 of articles 8 are originally supported on the first continuously moving conveyor means 4 and at the first transfer means 42, one of the articles 8 is moved over the second continuously moving conveyor means 16 and onto section 50 of the continuously moving collection conveyor means 40 leaving the first remainder of articles 18 on the second continuously moving conveyor means 16. At the second transfer means 44, one of the first remainder 18 of articles is moved over the third continuously moving conveyor means 22 and onto section 52 of the continuously moving collection conveyor means 40 leaving the second remainder 24 of articles on the third continuously moving conveyor means 22. At the third transfer means 46, one of the second remainder 24 of articles is moved over the fourth continuously moving conveyor means 28 and onto the section 54 of the continuously moving collection conveyor means 40 leaving the third remainder 30 of articles on the fourth continuously moving conveyor means 28. At the fourth transfer means 48, all of the third remainder 30 of articles are moved onto the section 56 of the continuously moving collection conveyor means 40.

The operation at the first, second and third transfer means 42, 44 and 46 is schematically illustrated in FIGS. 7-11 using the first transfer means 42 and the first and second continuously moving conveyor means 4 and 16. For explanation purposes, only three successive articles 60, 62 and 64 are used. Prior to the illustration in FIG. 7, article 60, originally on the first continuously moving conveyor means 4, moved into contact with a first deflector means 66 and was moved thereby onto the second continuously moving conveyor means 16. Article 62, originally on the first continuously moving conveyor means 4, moved into contact with the first deflector means 66 and into contact with article 60 The contact between articles 60 and 62 is accomplished and ensured by running the second continuously moving conveyor means 16 at a velocity which is substantially less than the velocity of the first continuously moving conveyor means 4 and is between about 70 and 80 percent of the velocity of the first continuously moving conveyor means 4 and preferably at a velocity of about 75 percent of the velocity thereof. As illustrated in FIG. 7, article 64 has moved into contact with article 62. At some point between FIGS. 7 and 8, a straight line between the points of contact between articles 60 and 62 and articles 62 and 64 will become less than the diameter of article 62. Because of the difference in the velocity between continuously moving conveyor means 4 and 16, article 64 is applying a pushing force on article 62 while article 60 is applying a restraining force on article 62. The resultant of these forces extends in the direction of the continuously moving collection conveyor 40 as indicated by the arrow 68 so that article 62 is being pushed by articles 60 and 64 across continuously moving conveyor means 16 as illustrated in FIGS. 8 and 9. At some point between FIGS. 9 and 10, article 62 moves into contact with section 50 of the collection conveyor means 40 and because of the speed of the collection conveyor means 40 is pulled away from its contact with articles 60 and 62 to move over section 50. As illustrated in FIGS. 1 and 12, second deflector means 74 cause the above process to be repeated so as to move articles 8 across continuously moving conveyor means 22 and onto section 52 of the continuously moving collection conveyor means 40. Third deflector means 76 cause the above-described process to be repeated so as to move articles 8 across continuously moving conveyor means 28 and onto section 54 of the continuously moving collection conveyor means 40.

As illustrated in FIGS. 1, 7-11 and 12, the deflector means 66, 74 and 76 have beginning portions located above the continuously moving collection conveyor means 4, 16, 22 and 28 and ending portions which terminate at locations spaced above a first portion of continuously moving conveyor means 16, 22 and 28. The third continuously moving conveyor means 22 moves at a velocity of between about 45 and 55 percent of the velocity of the first continuously moving conveyor means 4 and preferably at velocity of about 50 percent thereof and the fourth continuously moving conveyor means 28 moves at a velocity of between about 20 and 30 percent of the velocity of the first continuously moving conveyor means 4 and preferably at a velocity of about 25 percent thereof. Fourth deflector means 78 move articles 8 off of continuously moving conveyor means 28 and onto section 56 of the continuously moving collection conveyor means 40. The velocity at which articles 8 are moved by section 56 as compared to the velocity of continuously moving conveyor means 28 results in a separation of the articles 8 on the section 56.

The first and second deflector means 66 and 74 re illustrated in FIGS. 2 and 3 and comprise a pair of spaced apart members 80 which are held in such relationship by being secured to support means 82. The spaced apart members 80 have a first linear portion 84 which extends across continuously moving conveyor means 4 at an angle of between about 130 and 155 degrees and preferably of about 150 degrees; a second linear portion 86 which extends in a direction parallel to the linear direction of movement of continuously moving conveyor means 4 and 16 and a third linear portion 88 which extends across continuously moving conveyor means 16 at an angle of between about 130 and 155 degrees and preferably of about 150 degrees. The spaced apart members 80 are located so as to contact the articles above and below the center of gravity thereof. In FIG. 4, the relationship of the linear portion 86 of the spaced apart members 80 to the continuously moving conveyor means 16 and 22 is illustrated. A support plate 90 extends between and is secured to a pair of spaced apart fixed support legs 92 and 94 which extend slightly above the support plate 90. A plurality of blocks 100, 102, 104, 106 and 108 are mounted on the support plate 90 and function in a conventional manner to guide the movement of the continuously moving conveyor means 16 and 22. As illustrated in FIG. 4, the spaced apart members 80 are held in a location slightly above the continuously moving conveyor means 16 and 22 by support arms 110 fixedly mounted on the support leg 94. Each of the spaced apart guide means 80 has a reinforcing member 112 formed from a rigid material such as stainless steel secured thereto and an article contacting strip member 114 formed from a rigid plastic material having a low coefficient of friction such as tetrafluoroethylene resin marketed under the trademark TEFLON.

In FIG. 5, there is an illustration of the association of the section 50 of the continuously moving collection conveyor means 40 of standard construction and the continuously moving conveyor means 16. The continuously moving collection conveyor means 40 comprises a plurality of continuously rotating rods 120 which are rotated by conventional means (not shown) and over which the articles are moved.

The drive means 122 for the second, third and fourth continuously moving conveyor means 16, 22 and 28 is illustrated schematically in FIG. 6 and comprises a variable speed drive motor means 124 having control means 125 for varying the speed thereof fixedly mounted in a fixed support frame 126. A drive roller chain 128 is journaled around the variable speed drive motor means 124 and an idler sprocket means 130 so that the idler sprocket means 130 is rotated by the variable speed drive motor means 124. The second continuously moving conveyor means 16 is driven by the idler sprocket means 130 in a conventional manner as illustrated in FIG. 1. A drive roller chain 132 is journaled around idler sprocket means 130 and idler sprocket means 134 so that the idler sprocket means 134 is rotated by the idler sprocket means 130. A conventional drive tensioning means 136 ensures that the proper tension is maintained on the drive roller chain 132. The third continuously moving conveyor means 22 is driven by the idler sprocket means 134 in a conventional manner as illustrated in FIG. 1. A drive roller chain 138 is journaled around idler sprocket means 134 and idler sprocket means 140 so that the idler sprocket means 140 is rotated by the idler sprocket means 134. A conventional drive tensioning means 142 ensures that the proper tension is maintained on the drive roller chain 138. The fourth continuously moving conveyor means 28 is driven by the idler sprocket means 140 in a conventional manner as illustrated in FIG. 1.

Each of the idler sprocket means 130, 134 and 140, in FIG. 1, is fixedly mounted on the end of a shaft 144 which is mounted for rotation in spaced apart bearing means 146 and 148 which are fixedly mounted in the fixed support frame 150. A drive sprocket means 152 is fixedly mounted on each shaft 144 for rotation therewith and is in driving engagement in a conventional manner with the second, third and fourth continuously moving conveyor means 16, 22, and 28. Idler tensioning means 154 are suitably mounted to ensure that the proper tension is maintained on the second, third and fourth continuously moving conveyor means 16, 22 and 28. The drive ratio between the idler sprocket means 130 and 134 and between 134 and 138 is fixed.

In the preferred embodiment of the invention, the first continuously moving conveyor means 4 preferably moves at a velocity of about 107 feet per minute; the second continuously moving conveyor means 16 preferably moves at a velocity of about 80 feet per minute; the third continuously moving conveyor means 22 preferably moves at a velocity of between about 53 feet per minute and the fourth continuously moving conveyor means 28 preferably moves at a velocity of about 26 feet per minute. Articles are moved over the continuously moving collection conveyor means 40 at a preferred velocity of about 50 feet per minute. The speed of the second, third and fourth continuously moving conveyor means can be controlled relative to the speed of the first continuously moving conveyor means so as to form one, two three or four rows of articles on the collection conveyor means.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for changing a single row of moving articles into a plurality of rows of moving articles comprising:

a first continuously moving conveyor having a first plurality of articles in a continuous stream supported on an upper surface thereof;

said plurality of articles comprising a single row of articles moving with said upper surface in a first linear direction;

at least a portion of each of said plurality of articles having a generally cylindrical outer surface adapted to contact the generally cylindrical outer surfaces of adjacent articles and each of said generally cylindrical outer surfaces having substantially the same diameter;

at least a second continuously moving conveyor moving in a second linear direction;

said first and second linear directions being parallel to each other;

at least a portion of said first continuously moving conveyor and at least a portion of said second continuously moving conveyor being in a side by side relationship;

said second continuously moving conveyor moving at a velocity which is less than the velocity of said first continuously moving conveyor;

at least a first fixedly mounted deflector means for successively contacting each of said articles on said first continuously moving conveyor to apply a force thereto and to guide the movement of said successive articles toward and onto said second continuously moving conveyor;

each of said generally cylindrical outer surfaces of said deflected articles being moved toward and onto said second continuously moving conveyor being in contacting relationship with the article in front of it and the article in back of it;

said first deflector means having a beginning portion and an ending portion;

at least one continuously moving collection conveyor moving in a third linear direction;

said third linear direction being substantially perpendicular to said first and second linear directions;

said at least a first deflector means and said slower moving second continuously moving conveyor cooperating to produce force applying means adjacent to said ending portion of said at least a first deflector means for applying a force to at least one article of said deflected articles to move said at least one deflected article over said second continuously moving conveyor and onto said continuously moving collection conveyor means at a first location and leaving at least another one of said deflected articles on said second continuously moving conveyor for movement therewith;

at least a second deflected article located between said first and second continuously moving conveyors and in contact with said at least one deflected article; and said at least a second deflected article applying a pushing force to said at least one deflected article to ensure contact of said at least one deflected article with at least said second deflected article and a third deflected article on said second continuously moving conveyor means so that said at least a third deflected article applies a restraining force on said at least one deflected article so that the resultant of said pushing and restraining forces extends in a direction to move said at least one deflected article over said second continuously moving conveyor means and onto said continuously moving collection conveyor at said first location;

said second continuously moving conveyor having a second plurality of articles in a continuous stream supported on an upper surface thereof and moving therewith in a single row;

at least a third continuously moving conveyor moving in a fourth linear direction;

said second and fourth linear directions being parallel to each other;

at least a portion of said second continuously moving conveyor and at least a portion of said third continuously moving conveyor being in a side by side relationship;

said third continuously moving conveyor moving at a velocity which is less than the velocity of said second continuously moving conveyor;

at least a second fixedly mounted deflector means for successively contacting each of said second plurality of articles on said second continuously moving conveyor to apply a force thereto and to guide the movement of said successive articles toward and onto said third continuously moving conveyor;

each of said generally cylindrical outer surfaces of said deflected articles being moved toward and onto said third continuously moving conveyor being in contacting relationship with the article in front of it and the article in back of it;

said second deflector means having a beginning portion and an ending portion; and said at least a second deflector means and said slower continuously moving third conveyor cooperating to produce force applying means adjacent to said ending portion of said at least a second deflector means for applying a force to at least one article of said articles deflected by said second deflector means to move said at least one deflected article of said articles deflected by said at least a second deflector means over said third continuously moving conveyor and onto said continuously moving collection conveyor means at a second location spaced a distance from said first location and leaving at least another one of said deflected articles on said third continuously moving conveyor for movement therewith.

2. Apparatus as in claim 1 wherein said force applying means comprises:

at least a second article of said articles deflected by said at least a second deflector means located between said second and third continuously moving conveyors and in contact with said at least one article of said articles deflected by said second deflector means; and said at least a second article of said articles deflected by said at least a second deflector means applying a pushing force to said at least one article of said articles deflected by said second deflector means to to ensure contact of said at least one article of said articles deflected by said second deflector means with at least a third article of said articles deflected by said at least a second deflector means on said third continuously moving conveyor means so that said at least a third article of said articles deflected by said at least a second deflector means applies a restraining force on said at least one article of said articles deflected by said second deflector means so that the resultant of said forces extends in a direction to move said at least one article of said articles deflected by said second deflector means over said third continuously moving conveyor and onto said continuously moving collection conveyor means at said second location.

3. Apparatus as in claim 2 wherein:
said first and second deflector means extend at an angle between about 25 and 50 degrees to said first and second linear directions of movement.

4. Apparatus as in claim 3 wherein:
said first and second deflector means comprise a pair of spaced apart guide means located above said first, second and third continuously moving conveyor means so as to contact said articles above and below the centers of gravity thereof.

5. Apparatus as in claim 4 wherein:
said first and second deflector means having an article contacting strip material, formed from a plastic material having a low coefficient of friction, secured thereto.

6. Apparatus as in claim 2 wherein:
said velocity of said second continuously moving conveyor is between about 70 and 80 percent of the velocity of said first continuously moving conveyor; and
said velocity of said third continuously moving conveyor is between about 45 and 55 percent of the velocity of said second continuously moving conveyor.

7. Apparatus as in claim 6 and further comprising:
control means for varying the velocity of said second and third continuously moving conveyors.

8. Apparatus as in claim 2 wherein:
said articles are filled beverage bottles.

9. Apparatus for separating a plurality of articles moving in a single row in one linear direction into a plurality of spaced apart single rows of articles moving in a direction substantially perpendicular to such one linear direction comprising:
at least first, second and third continuously moving conveyors moving in spaced apart, parallel linear directions;
said first continuously moving conveyor having a plurality of articles in a continuous stream supported thereon;
said second continuously moving conveyor having all of said plurality of the articles in said continuous stream supported at some time on an upper surface thereof;
at least a portion of each of said plurality of articles having a generally cylindrical outer surface adapted to contact the generally cylindrical outer surfaces of adjacent articles and each of said generally cylindrical outer surfaces having substantially the same diameter;
continuously moving collection conveyor means for moving said articles in a direction other than said parallel linear directions;
at least first transfer means for causing contacting relationship of said cylindrical outer surfaces of at least three successive articles in said continuous stream of articles at the location of said first transfer means for moving the middle article of said at least three successive articles in said contacting relationship over said second continuously moving conveyor and onto said continuously moving collection conveyor at a first location thereon and leaving a first remainder of said articles in a continuous stream supported on said second continuously moving conveyor;
said first transfer means causes the first and third articles of said at least three successive articles to apply forces on said middle article with the resultant force of said forces extending in a direction toward and parallel to said linear direction of movement of said continuously moving collection conveyor means so that said first and third articles move said middle article in the direction of said resultant force and onto said moving collection conveyor;
said continuously moving collection conveyor means moving in a linear direction which is substantially perpendicular to the linear directions of movement of said first, second and third continuously moving conveyors;
said second continuously moving conveyor and said third continuously moving conveyor having all of said first remainder of said articles supported at some time on an upper surface thereof;
at least second transfer means for causing contacting relationship of said cylindrical surfaces of at least three successive articles in said first remainder of articles at the location of said second transfer means for moving the middle article of said at least three successive articles in said contacting relationship over said third continuously moving collection conveyor and onto said continuously moving collection conveyor at a second location spaced from said first location so that a second remainder of said articles are supported on said third continuously moving conveyor;
said second transfer means causes the first and third articles of said three successive articles to apply forces on said middle article with the resultant force of said forces extending in a direction toward and parallel to said linear direction of movement of said continuously moving collection conveyor so that said first and third articles move said middle article in the direction of said resultant force and onto said moving collection conveyor; and
at least another transfer means for transferring any remaining articles onto said continuously moving collection conveyor means at another location spaced from said first and second locations.

10. Apparatus as in claim 9 wherein said first transfer means comprises:
first deflector means for successively contacting each of said plurality of articles on said first continuously moving conveyor means and guiding the movement of said successive articles toward and onto said second continuously moving conveyor means;
said first deflector means terminating at a location spaced above a first portion of said second continuously moving conveyor means; and
said second continuously moving conveyor has a velocity less than said first continuously moving conveyor to cooperate with said first deflector means to provide said forces.

11. Apparatus as in claim 10 wherein said second transfer means includes:

second deflector means for successively contacting each of said plurality of articles on said first continuously moving conveyor means and guiding the movement of said successive articles toward and onto said second continuously moving conveyor means;

said second deflector means terminating at a location spaced above a first portion of said second continuously moving conveyor means; and said third continuously moving conveyor has a velocity less than said second continuously moving conveyor to cooperate with said second deflector means to provide said forces.

12. Apparatus as in claim 11 wherein:

said first and second deflector means extend at an angle between about 25 and 50 degrees to said linear direction of movement of said first, second and third continuously moving conveyors.

13. Apparatus as in claim 12 wherein:

each of said first and second deflector means extend in a linear direction and have an article contacting strip material, formed from a plastic material having a low coefficient of friction, secured thereto.

14. A method for separating a plurality of articles moving in a single row in one linear direction into a plurality of spaced apart single rows of articles moving in a direction substantially perpendicular to such one linear direction using spaced apart first, second and third continuously moving conveyors moving in linear directions parallel to such one linear direction and continuously moving collection conveyor means moving in the perpendicular direction comprising:

supplying a continuous stream of articles supported on and moving with said first continuously moving conveyor wherein:

at least a portion of each of said plurality of articles having a generally cylindrical outer surface adapted to contact the generally cylindrical outer surfaces of adjacent articles and each of said generally cylindrical outer surfaces having substantially the same diameter;

applying forces to at least three successive articles of said continuous stream of articles comprising first, second and third articles to move said three successive articles in a linear direction having an angular relationship with said one linear direction;

moving said first article onto said second conveyor means for movement therewith so as to change the linear direction of movement of said first article relative to the linear direction of movement of said second and third articles so that said cylindrical outer surface of said second article is in contact with said cylindrical outer surface of said first article and said third article with said forces including a pushing force by said third article on said second article and a restraining force by said first article on said second article so that said pushing force and said restraining force produce a resultant force to move said second article in a direction toward said moving collection conveyor means;

continuing the application of said pushing force and said restraining force until said second article has been moved onto said collection conveyor means for movement therewith; and repeating said foregoing steps using said second and third continuously moving conveyors.

* * * * *